Patented July 31, 1945

UNITED STATES PATENT OFFICE 2,380,473

CATALYSTS FOR THE ADDITION POLYMERIZATION OF UNSATURATED ORGANIC COMPOUNDS

William D. Stewart, Akron, Ohio, assignor to The B. F. Goodrich Company, New York, N. Y., a corporation of New York No Drawing. Application February 19, 1941, Serial No. 379,713

20 Claims. (Cl. 260—84.5)

This invention relates to the polymerization of unsaturated organic compounds which are capable of undergoing an addition polymerization to form high molecular weight linear polymers, more particularly to the polymerization of conjugated butadienes either alone, in mixtures with one another or with other polymerizable comonomers such as the vinyl and vinylidene compounds. The principal object of the invention is to provide a new class of catalysts or accelerators of polymerization by the use of which improved polymers may be obtained in increased yield and in a much shorter interval of time.

It is known that addition polymerizations may be accelerated or promoted by the presence of various substances among which are oxygen and oxygen yielding compounds such as hydrogen peroxide, benzoyl peroxide and persalts. However, with the use of such known polymerization initiators, considerable difficulty is still experienced in obtaining high yields of a desirable polymer in a short interval of time. Particularly in the commercial manufacture of polymers by emulsion polymerization, the production schedule is frequently disrupted by slow reactions and long induction periods before the polymerization starts.

I have now discovered a large number of substances which have been termed redox systems because of their property of catalyzing or promoting oxidation reduction reactions, particularly those occurring in biological processes, which substances are quite effective in promoting addition polymerizations and which are vastly superior to any previously described polymerization initiators or accelerators in that the polymerization is carried out in a much shorter time, the induction period is largely eliminated, lower temperatures for the polymerization may be employed and consequently a higher molecular weight more linear polymer possessing more desirable properties is obtained.

The class of redox systems, with which the present invention is concerned is that class which consists of a derivative of a phosphorus oxyacid combined with a water-soluble heavy metal salt. The term "heavy metal" as used herein is meant to include those metallic elements which have a density greater than four, an atomic weight greater than forty and a low atomic volume (ratio of atomic weight to density) and consequently appear substantially at the minimum points above an atomic weight of forty on Lothar Meyer's curve of atomic volumes (see any standard text book of Inorganic Chemistry such as Ephraim "Textbook of Inorganic Chemistry" p. 30 or Caven and Lander "Systematic Inorganic Chemistry" facing p. 30). The term "heavy metal" includes therefore those metals appearing in the center positions of the long periods of a periodic table arranged in short and long periods, and especially those occurring in the 6th to 12th positions of the long periods (considering the alkali metals to occupy the first position and all the rare earth metals to occupy a single position), that is, the metallic elements occurring in group VIII of the Mendeleef Periodic Table such as iron cobalt and nickel, those in subgroup B of groups I and II of the Mendeleef Periodic Table such as copper, silver, zinc, cadmium and mercury and those in subgroup A of groups VI and VII of the Mendeleef Periodic Table such as chromium, manganese and molybdenum. By the term "derivative of a phosphorus oxyacid" is included both the inorganic salts of phosphorus oxyacids such as the alkali, alkaline earth or heavy metal ortho phosphates, pyrophosphates, triphosphates, metaphosphates, tetraphosphates, orthophosphites, hypophosphites, metaphosphites and pyrophosphites, and the organic esters formed by the esterification of an organic compound containing an esterifiable hydroxy group with a phosphorus oxyacid such as the phosphates or pyrophosphates of alcohols, glycols and sugars, the nucleic acids and the phospholipids. In further clarification of the class of redox systems designated as "derivatives of phosphorus oxyacids combined with a water-soluble heavy metal salt" it is to be pointed out that this expression includes both complex compounds in which the heavy metal and the phosphorus oxyacid derivative or residue are contained in the same molecule, for example, the complex salt sodium ferri pyrophosphate, and also mixtures of the phosphorus containing compound and another compound containing the heavy metal which may not interact to give a complex, for example, a mixture of ferrous sulfate and sodium hypophosphite or a mixture of ferrous sulfate and glycerine monophosphate. As specific examples of redox systems coming within this definition there may be mentioned the following preferred compounds and mixtures:

Ferric pyrophosphate
Sodium ferro pyrophosphate
Sodium ferri pyrophosphate
Sodium cupro pyrophosphate
Sodium ferro triphosphate
Potassium cobalt triphosphate
Sodium hydrogen phosphate—ferric phosphate
Sodium hypophosphite—ferrous sulfate
Ferrous ferric lactophosphate
Ferric glycerophosphate
Fructose di phosphoric acid—ferrous sulfate
Alpha fructose-6-monophosphoric acid—cuprous chloride
Phosphoglyceric acid—cobaltous chloride
Lecithin—Ferric sulfate In the practice of this invention monomeric compounds or mixtures of monomers are polymerized by well known methods of polymerization such as by polymerization in homogenous systems or by polymerization in emulsions in presence of small amounts of the redox systems mentioned hereinabove. In the emulsion polymerization process, which is at present preferred, the monomer or monomer mixture is emulsified in a non-solvent liquid, usually water, with the aid of an emulsifying agent and polymerization is then effected by adding a redox system of this invention together, if desired, with various other substances the nature of which will be described hereinafter, and agitating the emulsion until polymer is formed. The resulting polymerized emulsion containing polymer particles dispersed in a liquid medium greatly resembles natural rubber latex and may be coagulated in the usual manner to yield the solid polymer.

The choice of the particular redox system to be employed in carrying out any given polymerization will depend upon a number of factors including the character of the substances being polymerized, the method of polymerization being used, and the nature of the other ingredients present in the polymerization mixture. Since it is believed that the function of the redox system is to facilitate or catalyze an oxidation reduction reaction which oxidizes or activates monomer molecules to such an extent that they are then capable of initiating a chain reaction which produces a high molecular weight linear polymer, it is desirable that the redox system employed be capable of most favorably exercising this function. Analogies with biological systems in which redox catalysts are known to exert a similar function in promoting biological oxidoreductions have proved of great value in this connection. For example, sodium ferri pyrophosphate is a well known catalyst for the oxidation of carbohydrates, and the hexose phosphates in presence of traces of a heavy metal are quite important in the conversion of sugars to glycogen or in the oxidative breakdown of hexoses in respiration. Although the choice of the particular redox systems to be used with various polymerization recipes will be more apparent after a discussion of the other ingredients present in the polymerization mixture, in general, it may be said that the complex salts containing a heavy metal occurring in the 6th to 12th positions of the first long period of the periodic table particularly iron, cobalt and copper, and a pyrophosphate radical, such as sodium ferri pyrophosphate, sodium cupro pyrophosphate or a mixture of sodium pyrophosphate and ferric pyrophosphate, are to be preferred for most polymerizations because they are economical to obtain and also are soluble in the ordinary aqueous emulsions which are polymerized.

The amount of the redox system to be used in polymerizations may be varied over wide limits provided that an excessive amount of the redox system does not inhibit or poison the polymerization reaction. For most purposes only catalytic amounts of the redox system, say less than 2% by weight based on the weight of the monomers, are needed and in most instances the polymerization proceeds most rapidly when from .5 to 1% of the redox system is present. When using redox systems containing some heavy metals particularly copper and manganese, however, it is desirable to use even smaller amounts, less than .5%, and preferably about 0.01%, since these metals in higher concentrations tend to inhibit the polymerization.

As has been mentioned hereinabove, the redox systems of this invention may be used, generally, in the polymerization of those unsaturated organic compounds which are capable of undergoing an addition polymerization to form a high molecular weight linear polymer. Among this class of monomers are the conjugated butadienes such as butadiene, isoprene, dimethyl butadine, chloroprene, piperylene and the like all of which contain a

group, monomer mixtures of two or more of these butadienes such as a mixture of butadiene and dimethyl butadiene, and monomer mixtures of conjugated butadienes with one or more other compounds which also contain a

group and which copolymerize with butadienes such as the vinyl compounds including aryl olefins and substituted aryl olefins such as styrene, p-chloro styrene, p-methoxy styrene, vinyl naphthalene and the like, acrylic and methacrylic acids, esters, nitriles and amides such as acrylic acid, acrylonitrile, methacrylonitrile, methyl acrylate, methyl methacrylate, butyl acrylate, methacrylamide and the like, and other vinyl compounds such as vinyl ketone, vinyl ethers, vinyl carbazole, vinyl furane and the like. Monomer mixtures of butadienes with other compounds containing a

group such as vinylidene chloride and the like may also be used. All these monomers and monomer mixtures when polymerized or copolymerized in the manner herein described form high molecular weight linear polymers. When the conjugated butadiene is the monomer or is the predominant constituent of a monomer mixture such polymers are rubbery in character and may be termed synthetic rubber.

Other monomers or monomer mixtures which are capable of undergoing addition polymerizations and which may be used in the process of this invention are the above-mentioned vinyl and vinylidene compounds, as well as other vinyl compounds such as vinyl chloride and vinyl acetate, either alone or in mixtures with one another, all of which polymerize to yield a linear polymer of a thermoplastic resinous character. Still other monomer mixtures which may form linear polymers are those which contain olefins, iso-olefins, and acetylenic hydrocarbons or their derivatives.

The improvement in polymerization rate effected by the redox catalysts of this invention for various monomers and monomer mixtures is illustrated in table I. In each case an emulsion of 10 grams of the monomer in 25 cc. of a 2% aqueous solution of myristic acid which has been 85% neutralized with sodium hydroxide, and also containing .035 gram of hydrogen peroxide and .03 gram of a polymerization modifier is allowed to polymerize in a constantly rotated, sealed glass tube. As shown in the table, polymerizations are effected both with and without the further addition of a redox system consisting of .065 gram of sodium pyrophosphate and .01 gram of ferric pyrophosphate. The yield, time and temperature recorded for each polymerization shows that the redox system allows the polymerization to proceed more rapidly and at a lower temperature and at the same time produces higher yields. Tests on the polymerization products also show that a higher molecular weight, more linear and consequently more desirable polymer is obtained.

*Table I*

| Monomer | Redox systems | Yield | Time | Temp. |
|---|---|---|---|---|
|  |  | Percent | Hours | ° C. |
| Butadiene 5.5 g | Absent | 95 | 48 | 30 |
| Acrylonitrile 4.5 g | Present | 99 | 23 | 30 |
| Butadiene 7.5 g | Absent | 95 | 135 | 30 |
| Styrene 2.5 l | Present | 100 | 66 | 30 |
| Butadiene 7.5 g | Absent | 92 | 48 | 30 |
| Methacrylonitrile 2.5 g | Present | 100 | 28 | 30 |
| Butadiene 7.5 g | Absent | 86 | 144 | 30 |
| Methyl methacrylate 2.5 g | Present | 97 | 74 | 30 |
| Vinyl chloride 10 g | Absent | None | 48 | 30 |
|  | Present | 90 | 48 | 30 |
| Acrylonitrile 10 g | Absent | 11 | 117 | 40 |
|  | Present | 65 | 117 | 40 |
| Styrene 10 g | Absent | 90 | 48 | 40 |
|  | Present | 97 | 44 | 35 |

The results shown in Table I are obtained in emulsion polymerization using a redox system with hydrogen peroxide as polymerization initiator, with partially neutralized fatty acid as emulsifying agent and with a polymerization modifier. It is also possible to produce a similar increase in the rate of polymerization by using a redox system in emulsions containing various other polymerization initiators and emulsifying agents as well as various polymerization modifiers such as dialkyl dixanthogens, diaryl disulfides, thiuram disulfides and other sulfur containing compounds known to increase the solubility and plasticity of the polymer. Among the initiators which may be used with the redox systems are hydrogen peroxide, organic peroxides, barium peroxide, potassium persulfate, sodium perborate, potassium percarbonate and the like, and other polymerization initiators such as diazoaminobenzene and sulfur dioxide. The redox systems of this invention may also be used advantageously in the polymerization of conjugated dienes carried out in presence of a peroxide and a peroxide activator such as sodium pyrophosphate, amino acids, and saturated or unsaturated fatty acids. Moreover, the redox systems of this invention may be used to effect polymerizations which are carried out in the absence of an added initiator. Table II shows the improvement effected by a redox system, sodium ferri pyrophosphate .075 g., in the emulsion polymerization of a mixture containing 4.5 g. of acrylonitrile and 5.5 g. of butadiene emulsified with 25 cc. of a 2% aqueous solution of 85% neutralized myristic acid, with various initiators and with no added initiator. The results show that the action of the redox system does not depend upon the presence of any particular polymerization initiator.

*Table II*

| Polymerization initiator | Redox system | Yield | Time | Temp. |
|---|---|---|---|---|
|  |  | Percent | Hours | ° C. |
| $H_2O_2$ | Absent | 95 | 48 | 30 |
|  | Present | 99 | 23 | 30 |
| $SO_2$ | Absent | 63 | 120 | 30 |
|  | Present | 95 | 120 | 30 |
| Diazoaminobenzene | Absent | 84 | 74 | 30 |
|  | Present | 91 | 50 | 30 |
| None | Absent | None | 150 | 30 |
|  | Present | 45 | 150 | 30 |

Although partially neutralized fatty acids are the preferred emulsifying agents to be used with the redox systems of this invention it is also possible to employ any of the ordinary emulsifying agents including completely neutralized fatty acid soaps such as sodium oleate or sodium palmitate and hymolal sulfates or sulfonates such as sodium lauryl sulfate and sodium isobutyl sulfonate. When using redox systems which work best under conditions similar to those present in living cells such as adenylic acid pyrophosphate in presence of a heavy metal, it may also be desirable to add other emulsifying or solubilizing agents which are present in biological systems such as bile salts, proteins, or other organic colloids.

Since sodium ferri pyrophosphate is one of the preferred redox systems and since it will function under a variety of conditions, the results tabulated have been obtained using this particular redox system. However, similar results may be obtained with any of the redox systems included in the scope of this invention. The following examples illustrate the use of other redox systems.

*Example I*

An aqueous emulsion made up as follows:

| | |
|---|---|
| Butadiene g | 5.5 |
| Acrylonitrile g | 4.5 |
| Emulsifying solution (2% aqueous solution of myristic acid 85% neutralized with sodium hydroxide) cc | 25 |
| Hydrogen peroxide (3½% sol.) cc | 1 |
| Polymerization modifier g | 0.03 |
| Sodium pyrophosphate g | 0.01 |
| Cuprous chloride g | 0.0001 | is polymerized for 20 hours at 30° C. A quantitative yield of a rubber-like butadiene acrylontrile copolymer is obtained. When using the same recipe without the sodium pyrophosphate cuprous chloride system, 48 hours are required to complete the polymerization.

*Example II*

An emulsion containing:

| | |
|---|---|
| Butadiene g | 7.5 |
| Methyl methacrylate g | 2.5 |
| Emulsifying agent (2% aqueous solution of 85% neutralized myristic acid) cc | 25 |
| Hydrogen peroxide (3½% sol.) cc | 1 |
| Polymerization modifier g | 0.03 |
| Ferrous sulfate g | 0.001 |
| Sodium hypophosphite g | 0.05 | is polymerized at 30° C. An 89% yield of a rubber-like copolymer is obtained in 25 hours. Without ferrous sulfate and sodium hypophosphite, only an 81% yield is obtained in 75 hours.

*Example III*

An emulsion containing:

| | |
|---|---|
| Butadiene g | 7.5 |
| Styrene g | 2.5 |
| Emulsifying agent (2% aqueous solution of 85% neutralized myristic acid) cc | 25 |
| Hydrogen peroxide (3½% solution) cc | 1 |
| Polymerization modifier g | 0.03 |
| Ferrous ferric lactophosphate g | .01 | is polymerized at 30° C. An 81% yield of copolymer is obtained in 110 hours. Without ferrous ferric lactophosphate it requires 110 hours to produce only a 59% yield.

Although various embodiments of the invention have been herein disclosed, it is not intended that the invention be limited solely thereto for it will be obvious to those skilled in the art that many modifications and variations are within the spirit and scope of the invention as defined by the appended claims.

I claim:

1. The method which comprises subjecting a polymerizable material consisting of at least one unsaturated organic compound which contains a

group and which undergoes in aqueous emulsion an addition polymerization to form a high molecular weight linear polymer, to polymerization in aqueous emulsion in the presence of a catalyst comprising a water-soluble heavy metal salt combined with a derivative of a phosphorus oxyacid selected from the class consisting of salts and esters of phosphorus oxyacids, the total concentration of the heavy metal salt and the said phosphorus oxyacid derivative being less than 2% by weight of the material polymerized and the concentration of the heavy metal salt being such that the polymerization proceeds more rapidly than in the absence of the heavy metal salt.

2. The method of claim 1 in which the material subjected to polymerization is a polymerizable conjugated butadiene.

3. The method of claim 1 in which the material subjected to polymerization is a mixture of a polymerizable conjugated butadiene and at least one other compound which contains a

group and is copolymerizable therewith in aqueous emulsion.

4. The method which comprises subjecting a mixture of a polymerizable conjugated butadiene and at least one other compound which contains a

group and is copolymerizable therewith in aqueous emulsion, to polymerization in aqueous emulsion in the presence of a water-soluble catalyst consisting of a water-soluble heavy metal salt combined with a pyrophosphate, the total concentration of the heavy metal salt and the pyrophosphate being less than 2% by weight of the material polymerized, and the concentration of the heavy metal salt being such that the polymerization proceeds more rapidly than in the absence of the heavy metal salt.

5. The method of claim 4 in which the water-soluble heavy metal salt is a salt of a metal occurring in the 6th to 12th positions of the first long period of the periodic table.

6. The method of claim 4 in which the catalyst is a mixture of an alkali metal pyrophosphate combined with a pyrophosphate of a metal occurring in the 6th to 12th positions of the first long period of the periodic table.

7. The method of claim 4 in which the material polymerized is a mixture of butadiene-1,3 and at least one copolymerizable vinyl compound and the catalyst is a mixture of an alkali metal pyrophosphate and a pyrophosphate of a heavy metal occurring in group VIII and the first long period of the periodic table.

8. The method of claim 4 in which the material polymerized is a mixture of butadiene-1,3 and acrylonitrile and the catalyst is a mixture of an alkali metal pyrophosphate and an iron pyrophosphate.

9. The method which comprises subjecting a polymerizable material consisting of at least one unsaturated organic compound which contains a

group and which undergoes in aqueous emulsion an addition polymerization to form a high molecular weight linear polymer, to polymerization in aqueous emulsion in the presence of a catalyst comprising a water-soluble complex compound of a heavy metal and a derivative of a phosphorus oxyacid selected from the class consisting of salts and esters of phosphorus oxyacids, the concentration of the said complex compound being less than 2% by weight of the material polymerized and such that the polymerization proceeds more rapidly than in the absence of the complex compound.

10. The method of claim 9 wherein the material polymerized is a mixture of a polymerizable conjugated butadiene and at least one other compound which contains a

group and is copolymerizable therewith in aqueous emulsion.

11. The method which comprises subjecting a polymerizable material consisting of at least one unsaturated organic compound which contains a

group and which undergoes in aqueous emulsion an addition polymerization to form a high molecular weight linear polymer, to polymerization in aqueous emulsion in the presence of a catalyst comprising a water-soluble complex compound containing a heavy metal atom and a pyrophosphate radical present in the same molecule, the concentration of the said complex compound being less than 2% by weight of the material polymerized and such that the polymerization proceeds more rapidly than in the absence of the complex compound.

12. The method of claim 11 wherein the material polymerized is a mixture of a polymerizable conjugated butadiene and at least one other compound which contains a

group and is copolymerizable therewith in aqueous emulsion.

13. The method of claim 11 wherein the catalyst is a complex alkali metal heavy metal pyrophosphate in which the heavy metal is a metal occurring in the 6th to 12th positions of the first long period of the periodic table.

14. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a water-soluble complex compound containing an atom of a heavy metal occurring in the 6th to 12th positions of the first long period of the periodic table and a pyrophosphate radical, the concentration of the said complex compound being less than 2% by weight of the material polymerized and such that the polymerization proceeds more rapidly than in the absence of the complex compound.

15. The method of claim 14 wherein the heavy metal is a heavy metal occurring group VIII and the first long period of the periodic table.

16. The method of claim 14 wherein the catalyst is an alkali metal heavy metal pyrophosphate in which the heavy metal is a metal occurring in group VIII and the first long period of the periodic table.

17. The method of claim 14 wherein the material polymerized is a mixture of butadiene-1,3 and acrylonitrile and the catalyst is an alkali metal iron pyrophosphate.

18. The method which comprises subjecting a polymerizable material consisting of at least one unsaturated organic compound which contains a

group and which undergoes in aqueous emulsion an addition polymerization to form a high molecular weight linear polymer, to polymerization in aqueous emulsion in the presence of a catalyst comprising a water-soluble complex compound of a heavy metal and of an ester of a phosphorus oxyacid, the concentration of the said complex compound being less than 2% by weight of the material polymerized and such that the polymerization proceeds more rapidly than in the absence of the complex compound.

19. The method of claim 18 wherein the heavy metal is a heavy metal occurring in group VIII and the first long period of the periodic table.

20. The method of claim 18 wherein the material polymerized is a mixture of butadiene-1,3 and a copolymerizable vinyl compound and the complex compound is an iron lactophosphate.

WILLIAM D. STEWART.

Certificate of Correction

Patent No. 2,380,473. July 31, 1945.

WILLIAM D. STEWART

It is hereby certified that errors appear in the printed specification of the above numbered patent requiring correction as follows: Page 3, second column, line 7, after "isobutyl" insert *naphthalene*; page 5, first column, line 6, claim 15, after "occurring" insert *in*; and that the said Letters Patent should be read with these corrections therein that the same may conform to the record of the case in the Patent Office.

Signed and sealed this 4th day of June, A. D. 1946.

[SEAL]

LESLIE FRAZER,
*First Assistant Commissioner of Patents.* ing less than 2% by weight of the material polymerized and such that the polymerization proceeds more rapidly than in the absence of the complex compound.

15. The method of claim 14 wherein the heavy metal is a heavy metal occurring group VIII and the first long period of the periodic table.

16. The method of claim 14 wherein the catalyst is an alkali metal heavy metal pyrophosphate in which the heavy metal is a metal occurring in group VIII and the first long period of the periodic table.

17. The method of claim 14 wherein the material polymerized is a mixture of butadiene-1,3 and acrylonitrile and the catalyst is an alkali metal iron pyrophosphate.

18. The method which comprises subjecting a polymerizable material consisting of at least one unsaturated organic compound which contains a

group and which undergoes in aqueous emulsion an addition polymerization to form a high molecular weight linear polymer, to polymerization in aqueous emulsion in the presence of a catalyst comprising a water-soluble complex compound of a heavy metal and of an ester of a phosphorus oxyacid, the concentration of the said complex compound being less than 2% by weight of the material polymerized and such that the polymerization proceeds more rapidly than in the absence of the complex compound.

19. The method of claim 18 wherein the heavy metal is a heavy metal occurring in group VIII and the first long period of the periodic table.

20. The method of claim 18 wherein the material polymerized is a mixture of butadiene-1,3 and a copolymerizable vinyl compound and the complex compound is an iron lactophosphate.

WILLIAM D. STEWART.

Certificate of Correction

Patent No. 2,380,473.   July 31, 1945.

WILLIAM D. STEWART

It is hereby certified that errors appear in the printed specification of the above numbered patent requiring correction as follows: Page 3, second column, line 7, after "isobutyl" insert *naphthalene*; page 5, first column, line 6, claim 15, after "occurring" insert *in*; and that the said Letters Patent should be read with these corrections therein that the same may conform to the record of the case in the Patent Office.

Signed and sealed this 4th day of June, A. D. 1946.

[SEAL]

LESLIE FRAZER,
*First Assistant Commissioner of Patents.*